(12) United States Patent
Hyeon

(10) Patent No.: US 11,505,035 B2
(45) Date of Patent: Nov. 22, 2022

(54) AIR CONDITIONING SYSTEM USING FUEL CELL SYSTEM

(71) Applicants: Hyundai Motor Company, Seoul (KR); Kia Motors Corporation, Seoul (KR)

(72) Inventor: Min Su Hyeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 541 days.

(21) Appl. No.: 16/539,594

(22) Filed: Aug. 13, 2019

(65) Prior Publication Data

US 2020/0298666 A1 Sep. 24, 2020

(30) Foreign Application Priority Data

Mar. 20, 2019 (KR) ................. 10-2019-0031976

(51) Int. Cl.
*F24F 11/46* (2018.01)
*B60H 1/14* (2006.01)
(Continued)

(52) U.S. Cl.
CPC ......... *B60H 1/143* (2013.01); *B60H 1/00271* (2013.01); *B60H 1/00385* (2013.01); *B60H 1/00485* (2013.01); *F24F 7/06* (2013.01); *F24F 11/0001* (2013.01); *F24F 11/30* (2018.01); *F24F 11/46* (2018.01); *F24F 2011/0002* (2013.01)

(58) Field of Classification Search
CPC ................ B60H 1/143; B60H 1/00385; B60H 1/00485; B60H 1/00271; F24F 11/0001; F24F 11/46; F24F 2011/0002
See application file for complete search history.

(56) References Cited

U.S. PATENT DOCUMENTS 5,791,408 A * 8/1998 Seem ....................... F24F 11/70
165/250
9,429,018 B2 * 8/2016 Zachary ................... F01B 23/10
(Continued)

FOREIGN PATENT DOCUMENTS

CN 103137989 A 6/2013
CN 106169593 A 11/2016
(Continued)

*Primary Examiner* — Steven S Anderson, II
*Assistant Examiner* — Phillip Decker
(74) *Attorney, Agent, or Firm* — Fox Rothschild LLP

(57) ABSTRACT

An air conditioning system using a fuel cell system can reduce energy consumption for air conditioning and can use the electricity produced by operating the fuel cells, where a fuel cell blower that is used to operate fuel cells is also used for air conditioning. The air conditioning system includes an air intake line connected between an interior and an exterior of a building; an air blower disposed in the air intake line to supply external air to the interior; a first intake shut-off valve for opening or closing the air intake line; a fuel cell system receiving air in the interior by operation of the fuel cell blower and producing electrical energy; and a controller controlling operation of the first intake shut-off valve to open the air intake line when the fuel cell system is operated.

14 Claims, 6 Drawing Sheets

(51) Int. Cl.
    *B60H 1/00*     (2006.01)
    *F24F 11/00*     (2018.01)
    *F24F 7/06*     (2006.01)
    *F24F 11/30*     (2018.01)

(56) References Cited

U.S. PATENT DOCUMENTS

2013/0236802 A1*   9/2013   Inoue ................ H01M 8/04302
                                                         429/423
2016/0126570 A1    5/2016   Nagai et al.

FOREIGN PATENT DOCUMENTS

| JP | 6389658 B2 | 9/2018 |
| --- | --- | --- |
| KR | 101417677 B1 | 7/2014 |
| KR | 101687691 B1 | 12/2016 |
| WO | 2011048734 A1 | 4/2011 |

* cited by examiner

AIR CONDITIONING SYSTEM USING FUEL CELL SYSTEM

CROSS REFERENCE TO RELATED APPLICATION

The present application claims under 35 U.S.C. § 119(a) the benefit of Korean Patent Application No. 10-2019-0031976, filed Mar. 20, 2019, the entire contents of which are incorporated by reference herein.

BACKGROUND

1. Technical Field

The present disclosure relates to an air conditioning system using a fuel cell system to reduce energy consumption for air conditioning while allowing for production and use of electricity by supplying air to the fuel cell system.

2. Description of the Related Art

An air conditioning system controls the temperature, humidity, flow, and cleanliness of air in an interior or at a specific place in accordance with a particular purpose or use.

For example, the air conditioning systems of buildings include air supply equipment such as a fan or a blower for supplying air to the interior, so air sent by the air supply equipment is purified through an air filter and then supplied into the buildings and the air contaminated in the interior is discharged outside the buildings.

The energy for supplying air to the interior is mostly consumed by mechanical equipment that uses electrical energy such as a fan or a blower, so there is a need for a plan that can reduce energy consumption for air conditioning.

The description provided above as a related art of the present disclosure is just for helping understanding the background of the present disclosure and should not be construed as being included in the related art known by those skilled in the art.

SUMMARY

The present disclosure provides an air conditioning system using a fuel cell system to reduce energy consumption for air conditioning while allowing for production and use of electricity by supplying air to the fuel cell system.

In accordance with an aspect the present disclosure, an air conditioning system for a fuel cell system includes: an air intake line connected between an interior and an exterior of a building that requires air conditioning; an air blower disposed in the air intake line and supplying external air to the interior; a first intake shut-off valve configured to open or close the air intake line; a fuel cell system receiving air in the interior by operation of a fuel cell blower and producing electrical energy through a chemical reaction between the received air and hydrogen fuel; and a controller controlling operation of the first intake shut-off valve such that the air intake line is opened and external air is supplied to the interior when the fuel cell system is operated.

The air intake line may be divided into a first intake line and a second intake line, the air blower may be disposed in the first intake line, and the first intake shut-off valve may be disposed in the second intake line.

The air intake line may include a common line having a first end connected to the exterior, and a first diverging line and a second diverging line having first ends diverging from a second end of the common line and second ends connected to the interior, the first intake shut-off valve may be a 3-way valve and may be disposed at a diverging point of the first diverging line and the second diverging line, and the air blower may be disposed in the first diverging line.

The controller may control the operation of the first intake shut-off valve such that the first diverging line is opened when the air conditioning system is operated by operation of the air blower, and when the fuel cell system is operated without the air conditioning system being operated, the controller may control the operation of the first intake shut-off valve such that the second diverging line is opened.

An air conditioning system for a fuel cell system includes: an air intake line connected between an interior and an exterior of a building that requires air conditioning; an air blower disposed in the air intake line and supplying external air to the interior; a flow rate control unit detecting and controlling the flow rate of air flowing through the air intake line; a fuel cell system receiving air in the interior by operation of a fuel cell blower and producing electrical energy through a chemical reaction between the received air and hydrogen fuel; and a controller controlling the operation of the fuel cell system, the air blower, and the flow rate control unit based on the flow rate of air flowing into the interior through the air intake line when the fuel cell system is operated.

The flow rate control unit may include: a flow rate sensor disposed in the air intake line and detecting the flow rate of air flowing through the air intake line; and a proportional flow control valve disposed in the air intake line and operating to control the flow rate of air flowing through the air intake line.

The controller may decrease the amount of air blown by the fuel cell blower when the flow rate of air detected by the flow rate sensor satisfies a set value, and may control the degree of opening of the proportional flow control valve to a maximum and the amount of air blown by the air blower to increase when the flow rate of air detected by the flow rate sensor does not satisfy the set value.

The controller may control the degree of opening of the proportional flow control valve to the maximum and airflow amount by the air blower to increase when the fuel cell system is not operated.

The air intake line may include a common line having a first end connected to the exterior, and a first diverging line and a second diverging line having first ends diverging from a second end of the common line and second ends connected to the interior, the first intake shut-off valve may be a 3-way valve and may be disposed at a diverging point of the first diverging line and the second diverging line, and the air blower may be disposed in the first diverging line.

The controller may control the operation of the first intake shut-off valve such that the first diverging line is opened when the air conditioning system is operated by operation of the air blower, and when the fuel cell system is operated without the air conditioning system being operated, the controller may control the operation of the first intake shut-off valve such that the second diverging line is opened.

The air conditioning system may further include: an assistant exhaust line connected between the interior and the fuel cell system to discharge interior air to the fuel cell system; a fuel cell intake line connected to the assistant exhaust line to supply external air; and a second intake shut-off valve being a 3-way valve and disposed at the joint of the fuel cell intake line and the assistant exhaust line.

When the fuel cell system is operated without the air blower operated, the controller may control the second intake shut-off valve so that external air is supplied to the fuel cell system through the fuel cell intake line.

A humidity sensor and an oxygen sensor may be installed before the second intake shut-off valve to measure the humidity and oxygen density of the interior air flowing into the assistant exhaust line, and the controller may control the second intake shut-off valve such that external air is supplied to the fuel cell system through the fuel cell intake line when the values measured by the humidity sensor and the oxygen sensor do not satisfy set values.

The air intake line may include a common line having a first end connected to the exterior, and a first diverging line and a second diverging line having first ends diverging from a second end of the common line and second ends connected to the interior, the first intake shut-off valve may be a 3-way valve and may be disposed at a diverging point of the first diverging line and the second diverging line, and the air blower may be disposed in the first diverging line.

The controller may control the operation of the first intake shut-off valve such that the first diverging line is opened when the air conditioning system is operated by operation of the air blower, and when the fuel cell system is operated without the air conditioning system being operated, the controller may control the operation of the first intake shut-off valve such that the second diverging line is opened.

According to the present disclosure, since the fuel cell blower that is operated to operate fuel cells is also used for air conditioning, it is possible to reduce energy consumption for air conditioning, and it is also possible to use the electricity produced by operating the fuel cells, whereby energy can be saved.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure are described hereafter in detail with reference to the accompanying drawings.

The air conditioning system using a fuel cell system of the present disclosure was designed not to only produce electricity using fuel cells, but also to reduce the energy and facility costs for providing air conditioning in a building 1, particularly, the building 1 such as a passive house enhanced in insulating and hermetic performance by applying a fuel cell system 23 to an air conditioning system of the building 1.

Figure 1:
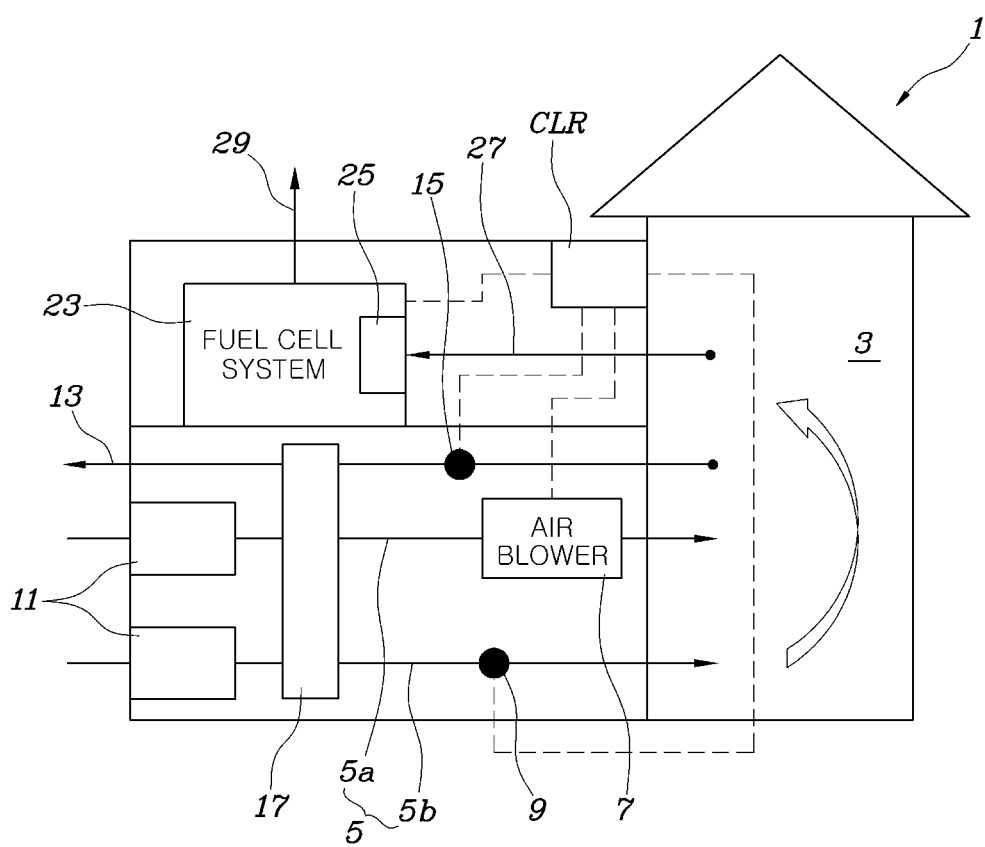
FIG. 1 is a view exemplifying the configuration of an air conditioning system according to a first embodiment of the present disclosure.

FIG. 1 is a view exemplifying the configuration of an air conditioning system according to a first embodiment of the present disclosure, which broadly includes an air intake line 5, an air blower 7, a first intake shut-off valve 9, a fuel cell system 23, and a controller CLR.

Referring to FIG. 1, first, the air intake line 5, which is a pipe connected between an interior and an exterior of a building 1 that requires air conditioning, has an end connected to the interior 3 of the building 1 and the other end connected to the exterior of the building 1.

The air blower 7 is disposed in the air intake line 5 and supplies external air to the interior 3.

The first intake shut-off valve 9, which opens/closes the air intake line 5, is operated by an actuator to open or close the air intake line 5.

The fuel cell system 23, which receives air in the interior by operation of a fuel cell blower 25 and produces electrical energy through a chemical reaction between the received air and hydrogen fuel, may be configured by combining a plurality of stack modules. However, the configuration of fuel cells that generate electrochemical reaction in the stack modules is known, so it is not described herein.

The controller CLR controls operation of the first intake shut-off valve 9 such that the air intake line 5 is opened and external air is supplied to the interior when the fuel cell system 23 is operated.

The controller according to an exemplary embodiment of the present disclosure can be implemented through a non-volatile memory (not shown) configured to store algorithms for controlling the operation of various components or data about software commands for executing the algorithms, and a processor (not shown) configured to perform operation to be described below using the data stored in the memory. The memory and the processor may be individual chips. Alternatively, the memory and the processor may be integrated in a signal chip. The processor may be implemented as one or more processors.

In particular, in the configuration according to the first embodiment, the air intake line 5 is divided into a first intake line 5a and a second intake line 5b, which are provided to cause external air to appropriately flow into corresponding intake lines, depending on the requirements of air conditioning of the building 1.

To this end, the first intake line 5a and the second intake line 5b are individually installed and the air blower 7 is disposed in the first intake line 5a, so that when the air blower 7 is operated, external air can flow into the interior through the first intake line 5a.

Further, the first intake shut-off valve 9 is disposed in the second intake line 5b, so that when the fuel cell blower 25 is operated to operate the fuel cell system 23, the second intake line 5b is opened by the operation of the first intake shut-off valve 9, whereby external air can flow into the interior through the second intake line 5b.

For reference, an air filter 11 is disposed at each of the inlets of the first intake line 5a and the second intake line 5b to purify and then send the air flowing into the intake lines to the interior.

An air exhaust line 13 is connected between the exterior and the interior, and an exhaust shut-off valve 15 that can operate to open/close is disposed in the air exhaust line 13, so the air in the interior can be discharged to the exterior. The exhaust shut-off valve 15 is also operated by an actuator, similar to the first intake shut-off valve 9, and the actuator operates in response to an operation signal from the controller CLR.

A heat exchanger 17 may be connected to the air intake line 5 and the air exhaust line 13 so that the air that flows into the interior through the air intake line 5 and the air that is discharged to the exterior through the air exhaust line 13 exchange heat with each other.

An assistant exhaust line 27 for discharging the interior air to the fuel cell system 23 is disposed between the interior of the building 1 and the fuel cell system 23, and the fuel cell blower 25 is disposed in the assistant exhaust line 27, so the interior air can be supplied to the fuel cell system 23 by operation of the fuel cell blower 25.

That is, according to the configuration of the first embodiment, the pipe for supplying air to the fuel cell system 23 is connected to the interior and the individual second intake line 5b, other than the first intake line 5a to which external air is supplied when the air blower 7 is operated, whereby the air conditioning by the air blower 7 can be assisted by the fuel cell system 23.

Therefore, since the fuel cell blower 25 that is operated to operate fuel cells is used also for air conditioning, it is possible to reduce energy consumption for air conditioning, and it is also possible to use the electricity produced by operating the fuel cells, whereby energy can be saved.

Figure 2:
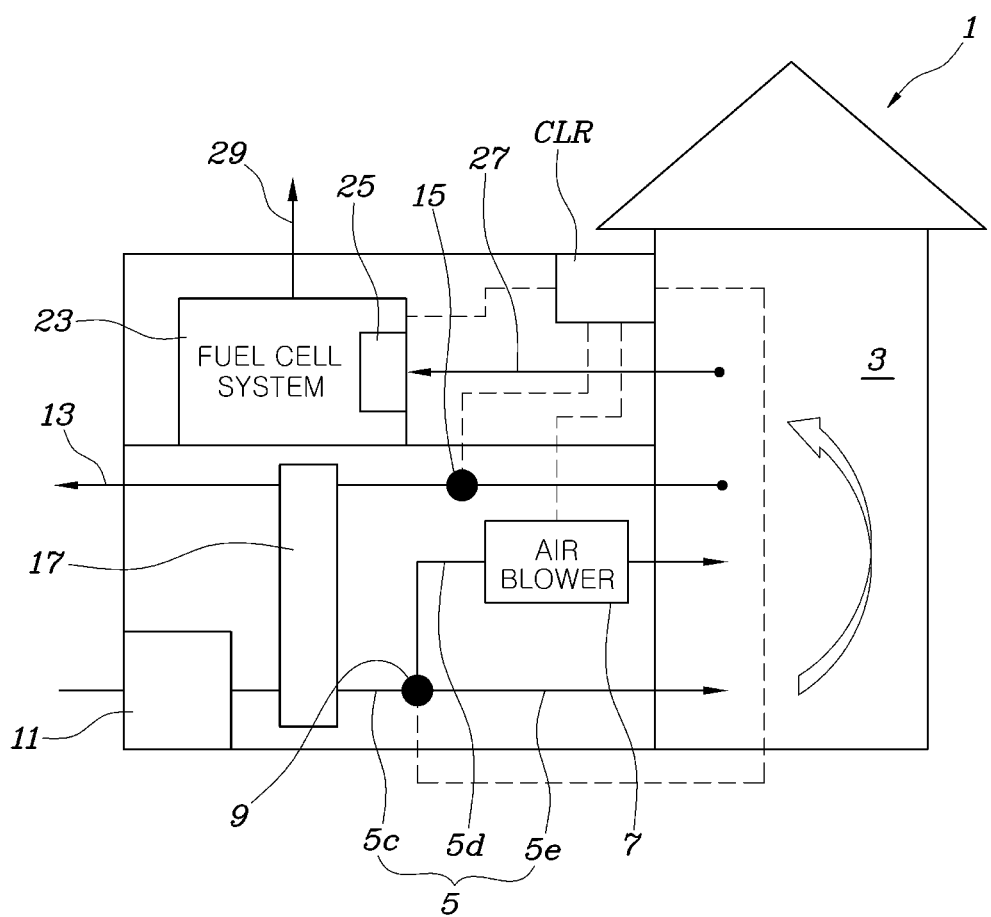
FIG. 2 is a view exemplifying the configuration of an air conditioning system according to a second embodiment of the present disclosure.

FIG. 2 is a view exemplifying the configuration of an air conditioning system according to a second embodiment of the present disclosure, in which the configuration of the air intake line 5 is changed in comparison to the configuration of the first embodiment.

Referring to FIG. 2, in the second embodiment, the air intake line 5 includes a common line 5c, a first diverging line 5d, and a second diverging line 5e, and a first end of the common line 5c is connected to the exterior.

A second end of the common line 5C is connected to a first end of the first diverging line 5d and a first end of the second diverging line 5e, the first diverging line 5d and the second diverging line 5e diverge from the second end of the common line 5c, and a second end of the first diverging line 5d and a second end of the second diverging line 5e are connected to the interior.

A first intake shut-off valve 9 is disposed at the point where the first diverging line 5d and the second diverging line 5e diverge. The first intake shut-off valve 9, which is a 3-way valve, operates to selectively open or close the first diverging line 5d and the second diverging line 5e.

Further, an air blower 7 is disposed in the first diverging line 5d, so that when the air blower 7 is operated, external air can flow into the interior through the first diverging line 5d.

For reference, in the second embodiment, the front portion of the air intake line 5 is the common line 5c and an air filter 11 is disposed at the inlet of the common line 5c so that air flowing into the first diverging line 5d and the second diverging line 5e is purified and then sent into the interior through the common line 5c.

Similar to the first embodiment, an air exhaust line 13, an exhaust shut-off valve 15, a heat exchanger 17, and an assistant exhaust line 27 are installed, which is the same as the configuration of the first embodiment, so it is not described not only here, but also in the embodiments to be described below.

Further, in the second embodiment, when the air blower 7 is operated and the air conditioning system is operated, the controller CLR controls the operation of the first intake shut-off valve 9 to open the first diverging line 5d so that external air can flow into the interior through the first diverging line 5d.

On the other hand, when the fuel cell blower 25 is operated to operate the fuel cell system 23 without the air conditioning system being operated, the controller controls the operation of the first intake shut-off valve 9 to open the second diverging line 5e so that external air can flow into the interior through the second diverging line 5e, so air can be supplied into the fuel cell system 23.

That is, according to the configuration of the second embodiment, since the 3-way valve is installed in the air intake line 5, it is possible to perform air conditioning through the air blower 7 or perform air conditioning by operating the fuel cell system 23.

Therefore, since the fuel cell blower 25 that is operated to operate fuel cells is used also for air conditioning, it is possible to reduce energy consumption for air conditioning, and it is also possible to use the electricity produced by operating the fuel cells, whereby energy can be saved.

Figure 3:
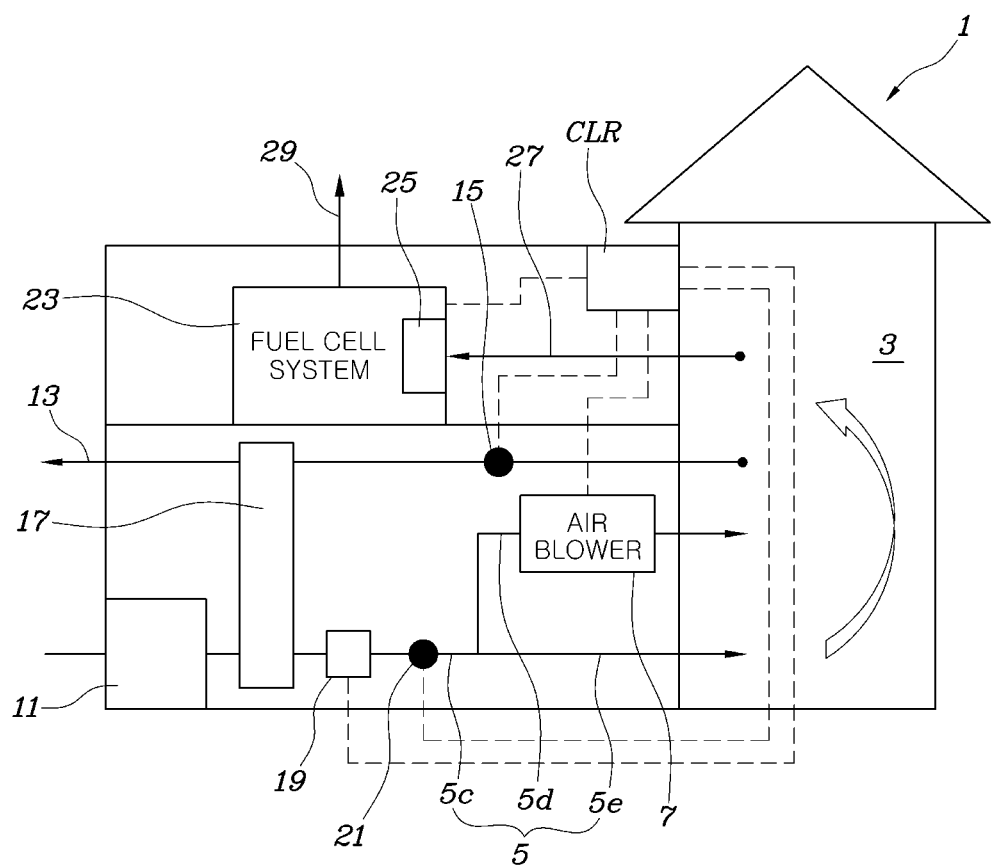
FIG. 3 is a view exemplifying the configuration of an air conditioning system according to a third embodiment of the present disclosure.

FIG. 3 is a view exemplifying the configuration of an air conditioning system according to a third embodiment of the present disclosure, which broadly includes an air intake line 5, an air blower 7, a flow rate control unit, a fuel cell system 23, and a controller CLR.

Referring to FIG. 3, first, the air intake line 5, which is a pipe connected between the interior and the exterior of a building 1 that requires air conditioning, has an end connected to the interior 3 of the building 1 and the other end connected to the exterior of the building 1.

The air blower 7 is disposed in the air intake line 5 and supplies external air to the interior 3.

The flow rate control unit, which detects and controls the flow rate of air passing through the air intake line 5, includes a flow rate sensor 19 and a proportional flow control valve 21.

For example, the flow rate sensor 19 is disposed in the air intake line 5 and detects the flow rate of air flowing through the air intake line 5.

The proportional flow control valve 21 is disposed in the air intake line 5 behind the flow rate sensor 19 and operated to control the flow rate of air flowing through the air intake line 5.

The flow rate sensor 19 is connected to the controller CLR so the value measured by the flow rate sensor 19 is input to the controller CLR. Further, the proportional flow control valve 21 is operated by an actuator and the actuator is operated in response to an operation signal from the controller CLR.

The fuel cell system 23, which receives air in the interior by the operation of a fuel cell blower 25 and produces electrical energy through a chemical reaction between the received air and hydrogen fuel, may be configured by combining a plurality of stack modules.

When the fuel cell system 23 is operated, the controller CLR controls the fuel cell system 23 and the operation of the air blower 7 and the flow rate control unit based on the flow rate of air flowing into the interior through the air intake line 5.

According to the control configuration, the controller CLR reduces the amount of air blown by the fuel cell blower 25 when the flow rate of air detected by the flow rate sensor 19 satisfies a set value.

However, when the flow rate of air detected by the flow rate sensor 19 does not satisfy the set value, the degree of opening of the proportional flow control valve 21 is controlled to a maximum and the amount of air blown by the air blower 7 is controlled to increase.

That is, in the third embodiment, the main air conditioning can be performed by the fuel cell system 23. When air conditioning is performed by the fuel cell system 23 and the flow rate of air (air-conditioning flow rate) measured by the flow rate sensor 19 is sufficient, the amount of air blown by the fuel cell blower 25 is reduced by controlling the output of the fuel cell. Accordingly, the flow rate of air flowing into the interior is reduced, so the flow rate of air can be appropriately controlled.

However, when main air conditioning is performed by the fuel cell system 23 and the flow rate of air (air-conditioning flow rate) measured by the flow rate sensor 19 is insufficient, the degree of opening of the proportional flow control valve 21 is controlled to the maximum and the amount of air blown by the air blower 7 is increased. Accordingly, the flow rate of air flowing into the interior is increased, so the air-conditioning flow rate can be appropriately controlled.

Further, when the fuel cell system 23 is not operated, the controller CLR controls the degree of opening of the proportional flow control valve 21 to the maximum and increases the amount of air blown by the air blower 7.

That is, when the fuel cell system 23 is turned off and not operated, the degree of opening of the proportional flow control valve 21 is controlled to the maximum and the amount of air blown by the air blower 7 is increased. Accordingly, the flow rate of air flowing into the interior is increased, so the air-conditioning flow rate can be appropriately controlled. Further, air conditioning for the interior can be performed by operation of the air blower 7.

Figure 4:
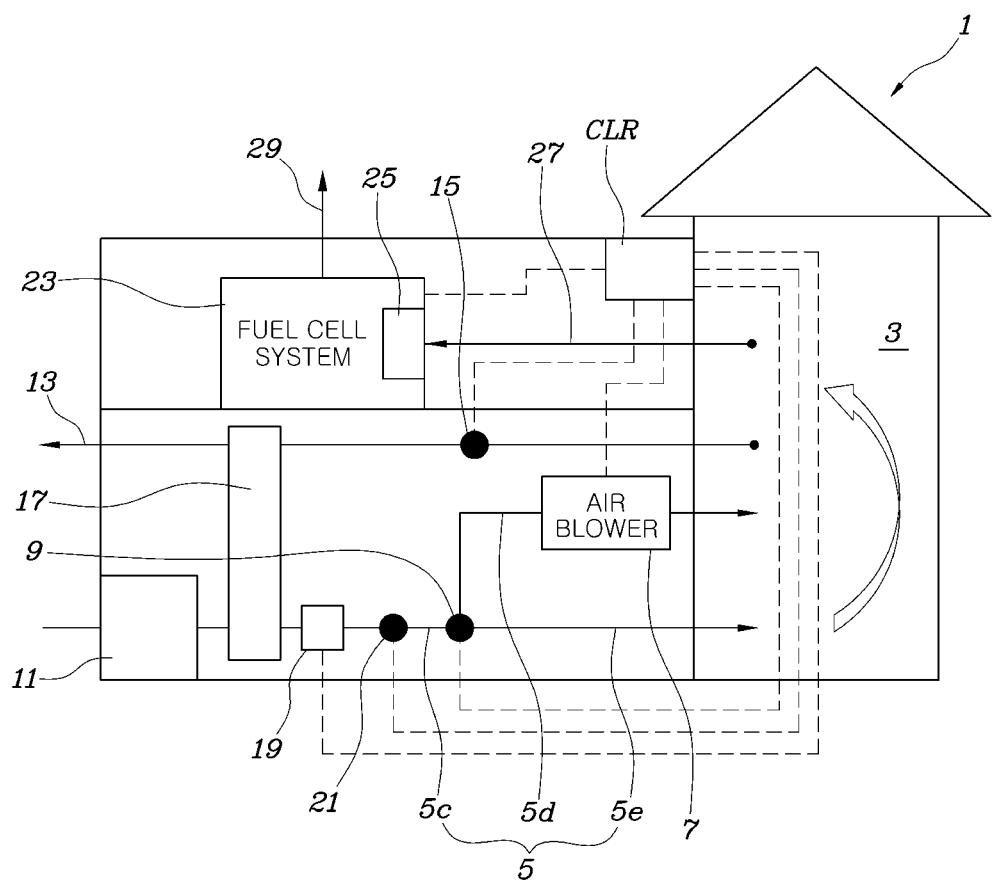
FIG. 4 is a view exemplifying the configuration of an air conditioning system according to a fourth embodiment of the present disclosure.

FIG. 4 is a view exemplifying the configuration of an air conditioning system according to a fourth embodiment of the present disclosure, in which the first intake shut-off valve 9 is further disposed in the air intake line 5 in comparison to the configuration of the third embodiment.

Referring to FIG. 4, in both of the third and fourth embodiments, the air intake line 5 includes a common line 5c, a first diverging line 5d, and a second diverging line 5e, and an end of the common line 5c is connected to the exterior.

A second end of the common line 5C is connected to a first end of the first diverging line 5d and a first end of the second diverging line 5e, the first diverging line 5d and the second diverging line 5e diverge from the second end of the common line 5c, and a second end of the first diverging line 5d and a second end of the second diverging line 5e are connected to the interior.

A first intake shut-off valve 9 is disposed at the point where the first diverging line 5d and the second diverging line 5e diverge. The first intake shut-off valve 9, which is 3-way valve, operates to selectively open or close the first diverging line 5d and the second diverging line 5e.

Further, the air blower 7 is disposed in the first diverging line 5d, so that when the air blower 7 is operated, external air can flow into the interior through the first diverging line 5d.

Further, in the fourth embodiment, when the air blower 7 is operated and the air conditioning system is operated, the controller CLR controls the operation of the first intake shut-off valve 9 to open the first diverging line 5d so that external air can flow into the interior through the first diverging line 5d.

On the other hand, when the fuel cell blower 25 is operated to operate the fuel cell system 23 without the air conditioning system being operated, the controller controls the operation of the first intake shut-off valve 9 to open the second diverging line 5e so that external air can flow into the interior through the second diverging line 5e, so air can be supplied into the fuel cell system 23.

That is, according to the configuration of the fourth embodiment, since the 3-way valve is used as the first intake shut-off valve 9, it is possible to perform air conditioning through the air blower 7 or perform air conditioning by operating the fuel cell system 23.

Therefore, since the fuel cell blower 25 that is operated to operate fuel cells is used also for air conditioning, it is possible to reduce energy consumption for air conditioning, and it is also possible to use the electricity produced by operating the fuel cells, whereby energy can be saved.

Figure 5:
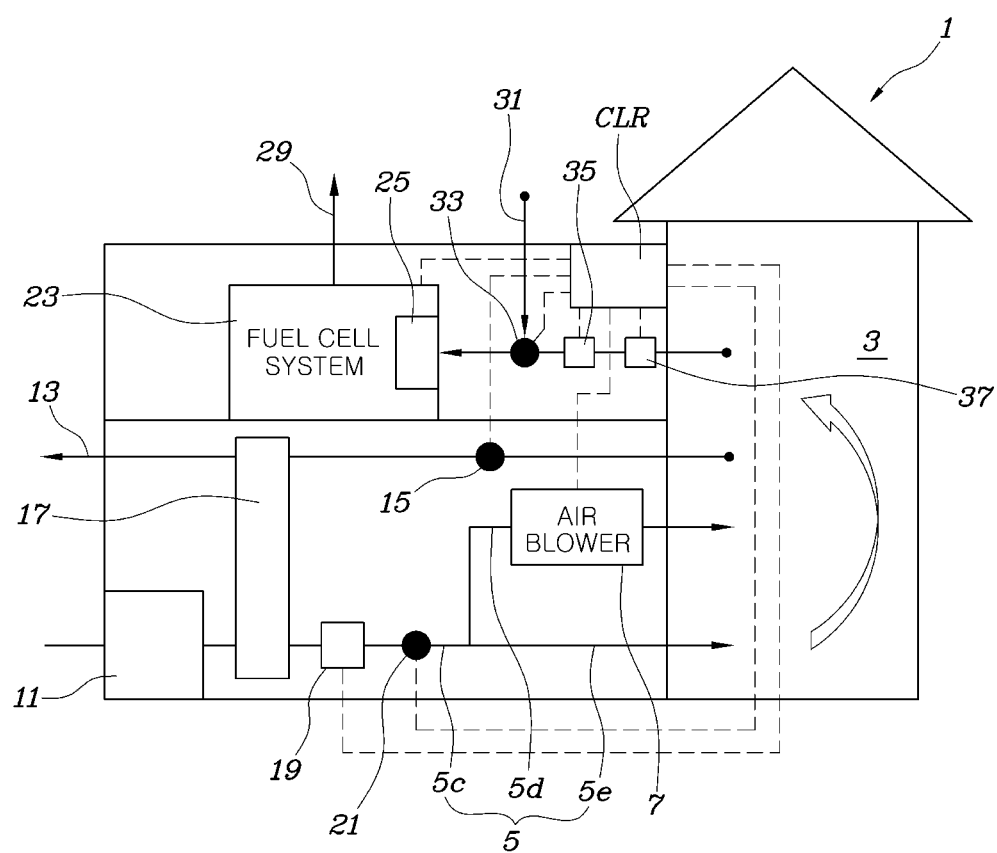
FIG. 5 is a view exemplifying the configuration of an air conditioning system according to a fifth embodiment of the present disclosure.

FIG. 5 is a view exemplifying the configuration of an air conditioning system according to a fifth embodiment of the present disclosure, in which an intake line for supplying external air to the fuel cell system 23 is further provided in comparison to the configuration of the third embodiment.

Referring to FIG. 5, an assistant exhaust line 27 is connected between the interior of the building 1 and the fuel cell system 23, thereby discharging interior air to the fuel cell system 23.

A first end of a fuel cell intake line 31 is connected to the assistant exhaust line 27 and a second end of the fuel cell intake line 31 is connected to the exterior of the building 1, so external air can be supplied to the assistant exhaust line 27 through the fuel cell intake line 31.

A second intake shut-off valve 33 that is a 3-way valve is disposed at the joint of the fuel cell intake line 31 and the assistant exhaust line 27. Accordingly, interior air can be supplied to the fuel cell system 23 or external air can be supplied from the fuel cell intake line 31 by operation of the second intake shut-off valve 33.

For reference, the fuel cell exhaust line 29 is provided to discharge air, which has undergone reaction in the fuel cell system 23, to the exterior and an exhaust shut-off valve (not shown) that can open and close may be further disposed in the fuel cell exhaust line 29.

Further, the second intake shut-off valve 33 is also operated by an actuator, similar to the first intake shut-off valve 9, and the actuator operates in response to an operation signal from the controller CLR.

Accordingly, when the fuel cell system 23 is operated without the air blower 7 being operated, the controller CLR can control the second intake shut-off valve 33 so that external air is supplied to the fuel cell system 23 through the fuel cell intake line 31.

That is, when external air is supplied by opening the fuel cell intake line 31 using the second intake shut-off valve 33, the fuel cell system 23 can be operated regardless of interior air conditioning by the air blower 7. Interior air conditioning can be performed by operation of the air blower 7. Further, it is possible to control the air-conditioning airflow amount while minimizing power of the air blower 7 by appropriately controlling the ratio of the external air supplied from the fuel cell intake line 31 and the interior air supplied through the assistant exhaust line 27.

Further, in the fifth embodiment, a humidity sensor 35 and an oxygen sensor 37 may be installed before (i.e., ahead of) the second intake shut-off valve 33 to measure the humidity and oxygen density of interior air flowing into the assistant exhaust line 27. The values measured by the humidity sensor 35 and the oxygen sensor 37 are input to the controller CLR, whereby the second intake shut-off valve 33 can be controlled.

To this end, when the values measured by the humidity sensor 35 and the oxygen sensor 37 do not satisfy set values, the controller CLR can control the second intake shut-off valve 33 such that external air is supplied to the fuel cell system 23 through the fuel cell intake line 31.

That is, when the humidity, oxygen density, etc. of air that is discharged through the assistant line 27 from the interior are measured and it is determined that the humidity and the oxygen density are not suitable for operating the fuel cell, external air can be supplied through the fuel cell intake line 31 and used to operate the fuel cell system 23.

Figure 6:
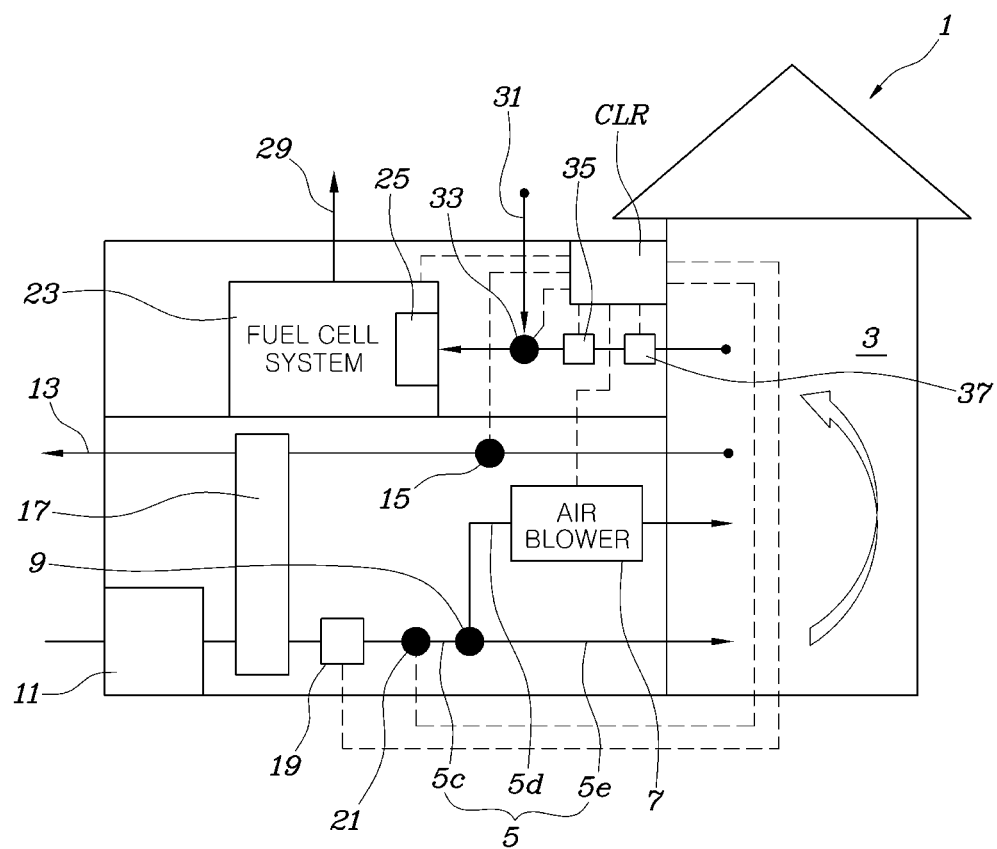
FIG. 6 is a view exemplifying the configuration of an air conditioning system according to a sixth embodiment of the present disclosure.

FIG. 6 is a view exemplifying the configuration of an air conditioning system according to a sixth embodiment of the present disclosure, in which the first intake shut-off valve 9 is further disposed in the air intake line 5 in comparison to the configuration of the fifth embodiment.

Referring to FIG. 6, in both the fifth and sixth embodiments, the air intake line 5 includes a common line 5c, a first diverging line 5d, and a second diverging line 5e, and an end of the common line 5c is connected to the exterior.

A second end of the common line 5C is connected to a first end of the first diverging line 5d and a first end of the second diverging line 5e, the first diverging line 5d and the second diverging line 5e diverge from the second end of the common line 5c, and a second end of the first diverging line 5d and a second end of the second diverging line 5e are connected to the interior.

A first intake shut-off valve 9 is disposed at the point where the first diverging line 5d and the second diverging line 5e diverge. The first intake shut-off valve 9, which is a 3-way valve, operates to selectively open or close the first diverging line 5d and the second diverging line 5e.

Further, the air blower 7 is disposed in the first diverging line 5d, so that when the air blower 7 is operated, external air can flow into the interior through the first diverging line 5d.

Further, in the sixth embodiment, when the air blower 7 is operated and the air conditioning system is operated, the controller CLR controls the first intake shut-off valve 9 to open the first diverging line 5d so that external air can flow into the interior through the first diverging line 5d.

On the other hand, when the fuel cell blower 25 is operated to operate the fuel cell system 23 without the air conditioning system being operated, the controller controls the operation of the first intake shut-off valve 9 to open the second diverging line 5e so that external air can flow into the interior through the second diverging line 5e, so air can be supplied into the fuel cell system 23.

That is, according to the configuration of the sixth embodiment, since the 3-way valve is installed in the air intake line 5, it is possible to perform air conditioning through the air blower 7 or perform air conditioning by operating the fuel cell system 23.

Therefore, since the fuel cell blower 25 that is operated to operate fuel cells is used also for air conditioning, it is possible to reduce energy consumption for air conditioning, and it is also possible to use the electricity produced by operating the fuel cells, whereby energy can be saved.

On the other hand, although the present disclosure was described with reference to the detailed embodiments, it is apparent to those skilled in the art that the present disclosure may be changed and modified in various ways without the scope of the present disclosure and it should be noted that the changes and modifications are included in claims.

What is claimed is:

1. An air conditioning system for a fuel cell system, the air conditioning system comprising:
    an air intake line connected between an interior and an exterior of a building that requires air conditioning;
    an air blower disposed in the air intake line and supplying external air to the interior;
    a first intake shut-off valve configured to open or close the air intake line;
    the fuel cell system receiving air in the interior by operation of a fuel cell blower and producing electrical energy through a chemical reaction between the received air and hydrogen fuel; and
    a controller controlling operation of the first intake shut-off valve such that the air intake line is opened and external air is supplied to the interior when the fuel cell system is operated.

2. The air conditioning system of claim 1, wherein the air intake line is divided into a first intake line and a second intake line,
    the air blower is disposed in the first intake line, and
    the first intake shut-off valve is disposed in the second intake line.

3. The air conditioning system of claim 1, wherein the air intake line includes a common line having a first end connected to the exterior, and a first diverging line and a second diverging line having first ends diverging from a second end of the common line and second ends connected to the interior,
    the first intake shut-off valve is a 3-way valve and is disposed at a diverging point of the first diverging line and the second diverging line, and
    the air blower is disposed in the first diverging line.

4. The air conditioning system of claim 3, wherein the controller controls operation of the first intake shut-off valve such that the first diverging line is opened when the air conditioning system is operated by operation of the air blower, and when the fuel cell system is operated without the air conditioning system being operated, the controller controls operation of the first intake shut-off valve such that the second diverging line is opened.

5. An air conditioning system for a fuel cell system, the air conditioning system comprising:

an air intake line connected between an interior and an exterior of a building that requires air conditioning;

an air blower disposed in the air intake line and supplying external air to the interior;

a flow rate control unit detecting and controlling a flow rate of air flowing through the air intake line;

the fuel cell system receiving air in the interior by operation of a fuel cell blower and producing electrical energy through a chemical reaction between the received air and hydrogen fuel; and a controller controlling operation of the fuel cell system, the air blower, and the flow rate control unit based on the flow rate of air flowing into the interior through the air intake line when the fuel cell system is operated;

wherein the flow rate control unit includes a proportional flow control valve disposed in the air intake line and operating to control the flow rate of air flowing through the air intake line; and wherein the controller controls a degree of opening of the proportional flow control valve to a maximum and airflow amount by the air blower to increase when the fuel cell system is not operated.

6. The air conditioning system of claim 5, wherein the flow rate control unit further includes a flow rate sensor disposed in the air intake line and detecting the flow rate of air flowing through the air intake line.

7. The air conditioning system of claim 6, wherein the controller decreases the amount of air blown by the fuel cell blower when the flow rate of air detected by the flow rate sensor satisfies a set value, and controls a degree of opening of the proportional flow control valve to a maximum and the amount of air blown by the air blower to increase when the flow rate of air detected by the flow rate sensor does not satisfy the set value.

8. The air conditioning system of claim 6, wherein the air intake line includes a common line having a first end connected to the exterior, and a first diverging line and a second diverging line having first ends diverging from a second end of the common line and second ends connected to the interior, a first intake shut-off valve is a 3-way valve and is disposed at a diverging point of the first diverging line and the second diverging line, and the air blower is disposed in the first diverging line.

9. The air conditioning system of claim 8, wherein the controller controls operation of the first intake shut-off valve such that the first diverging line is opened when the air conditioning system is operated by operation of the air blower, and when the fuel cell system is operated without the air conditioning system being operated, the controller controls operation of the first intake shut-off valve such that the second diverging line is opened.

10. The air conditioning system of claim 6, further comprising:

an assistant exhaust line connected between the interior and the fuel cell system to discharge interior air to the fuel cell system;

a fuel cell intake line connected to the assistant exhaust line to supply external air; and a second intake shut-off valve being a 3-way valve and disposed at the joint of the fuel cell intake line and the assistant exhaust line.

11. The air conditioning system of claim 10, when the fuel cell system is operated without the air blower operated, the controller controls the second intake shut-off valve so that external air is supplied to the fuel cell system through the fuel cell intake line.

12. The air conditioning system of claim 10, a humidity sensor and an oxygen sensor are installed before the second intake shut-off valve to measure the humidity and oxygen density of interior air flowing into the assistant exhaust line, and the controller controls the second intake shut-off valve such that external air is supplied to the fuel cell system through the fuel cell intake line when the values measured by the humidity sensor and the oxygen sensor do not satisfy set values.

13. The air conditioning system of claim 10, wherein the air intake line includes a common line having a first end connected to the exterior, and a first diverging line and a second diverging line having first ends diverging from a second end of the common line and second ends connected to the interior, the first intake shut-off valve is a 3-way valve and is disposed at a diverging point of the first diverging line and the second diverging line, and the air blower is disposed in the first diverging line.

14. The air conditioning system of claim 13, wherein the controller controls operation of the first intake shut-off valve such that the first diverging line is opened when the air conditioning system is operated by operation of the air blower, and when the fuel cell system is operated without the air conditioning system being operated, the controller controls operation of the first intake shut-off valve such that the second diverging line is opened.

* * * * *